(12) United States Patent
Kutter

(10) Patent No.: US 7,177,305 B2
(45) Date of Patent: Feb. 13, 2007

(54) INTER-SWITCH TELECOMMUNICATIONS SYSTEM FOR INTERCONNECTING PACKET-CAPABLE TIME DIVISION MULTIPLEXED SWITCHES WITH NON-PACKET-CAPABLE TIME DIVISION MULTIPLEXED SWITCHES VIA AN ASYNCHRONOUS TRANSFER MODE NETWORK

(75) Inventor: Robert W. Kutter, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1100 days.

(21) Appl. No.: 10/133,958

(22) Filed: Apr. 25, 2002

(65) Prior Publication Data

US 2003/0202484 A1 Oct. 30, 2003

(51) Int. Cl.
*H04L 12/66* (2006.01)
*H04L 12/28* (2006.01)

(52) U.S. Cl. .................. 370/356; 370/392; 370/395.2; 370/399; 370/409

(58) Field of Classification Search ..................... None
See application file for complete search history.

(56) References Cited

U.S. PATENT DOCUMENTS

| | | | |
|---|---|---|---|
| 5,568,475 A * | 10/1996 | Doshi et al. ................. | 370/399 |
| 5,889,773 A | 3/1999 | Stevenson, III | |
| 6,240,086 B1 | 5/2001 | Morgan et al. | |
| 6,389,011 B2 * | 5/2002 | Allen et al. .................. | 370/356 |
| 6,674,750 B1 * | 1/2004 | Castellano ................... | 370/354 |
| 6,865,179 B1 * | 3/2005 | Cao ............................ | 370/352 |
| 6,931,002 B1 * | 8/2005 | Simpkins et al. ............ | 370/354 |
| 6,959,008 B2 * | 10/2005 | McClary et al. ............ | 370/474 |
| 6,990,121 B1 * | 1/2006 | Stiles et al. .................. | 370/498 |
| 7,006,489 B2 * | 2/2006 | Li et al. ...................... | 370/352 |
| 2001/0005379 A1 | 6/2001 | Pickett | |
| 2001/0036176 A1 | 11/2001 | Girard | |

* cited by examiner

*Primary Examiner*—Chi Pham
*Assistant Examiner*—Melanie Jagannathan

(57) ABSTRACT

The inter-switch interconnect system functions to interface a packet switch with a legacy Time Division Multiplexed switch without requiring any changes to the Time Division Multiplexed switch. The inter-switch interconnect system implements a packet-based call connection system that is triggered by the standard CCS7-ISUP signaling protocol, where the packet-capable Time Division Multiplexed switch controls the set-up and tear-down of the packet connections through the Asynchronous Transfer Mode network to the non-packet-capable Time Division Multiplexed switch using the standard CCS7-ISUP signaling protocol for both incoming and outgoing calls. The packet-capable Time Division Multiplexed switch controls call connections both to and from the legacy non-packet-capable Time Division Multiplexed switch.

14 Claims, 3 Drawing Sheets

INTER-SWITCH TELECOMMUNICATIONS SYSTEM FOR INTERCONNECTING PACKET-CAPABLE TIME DIVISION MULTIPLEXED SWITCHES WITH NON-PACKET-CAPABLE TIME DIVISION MULTIPLEXED SWITCHES VIA AN ASYNCHRONOUS TRANSFER MODE NETWORK

FIELD OF THE INVENTION

This invention relates to telecommunication switching networks and, in particular, to a system for interconnecting packet-capable Time Division Multiplexed switches with legacy non-packet-capable Time Division Multiplexed switches.

Problem

It is a problem in the field of telecommunications to integrate new technology into the embedded base of legacy equipment. A particular problem is encountered in the migration of packet-based and packet-capable Time Division Multiplexed switches into a non-packet-capable Time Division Multiplexed switching network. The packet-capable Time Division Multiplexed switch and the legacy non-packet-capable Time Division Multiplexed switch are incompatible and difficult to interconnect as are the packet switch and the legacy non-packet-capable Time Division Multiplexed switch. For example, Time Division Multiplexed switches interface with each other via Time Division Multiplexed circuits and use the industry standard CCS7-ISUP signaling protocol to exchange control signals and coordinate the operation of the Time Division Multiplexed switches. In an analogous manner, the packet switches interface with each other via a packet backbone network and use a collaborative call set-up and completion system that use the industry standard B-ISUP signaling protocol or the industry standard Bearer Independent Call Control (BICC) signaling protocol. However, the packet switches with their BICC call processing are not backward compatible with the existing Time Division Multiplexed switches with their TDM call processing.

One system that addresses this problem is disclosed in U.S. Pat. No. 6,240,086 wherein a telecommunications gateway is used to allow packets to be transmitted over a Time Division Multiplexed (TDM) system and accepts Time Division Multiplexed traffic for transmission over a packet switched network. This telecommunications gateway is a universal port that includes a time slot interchanger which routes Time Division Multiplexed traffic according to an allocation of time slots. The telecommunications gateway also includes a plurality of Digital Signal Processors, each of which downloads software as a function of the protocol conversion to be performed and then performs the single signal protocol conversion function over multiple signaling channels. The time slot interchanger routes Time Division Multiplexed traffic to the Digital Signal Processors that are processing these signals into packets and receives time division multiplexed signals from the Digital Signal Processors that are converting packets into Time Division Multiplexed traffic.

U.S. Pat. No. 5,889,773 discloses a host digital terminal that receives Asynchronous Transfer Mode cells that contain packet data and Time Division Multiplexed telephony traffic. The host digital terminal converts the Time Division Multiplexed traffic into Asynchronous Transfer Mode cells that contain packet data and places both the Asynchronous Transfer Mode cells that contain packet data and the converted time division multiplexed telephony traffic into a Synchronous Optical Network (SONET) frame for transmission over an optical network.

U.S. Patent Application 20010005379A1 discloses a multi-protocol framing system that is switchably connected to a processor via a packet bus. A wideband data transmission medium is connected to the multi-protocol framing system via a Time Division Multiplexed bus. The multi-protocol framing system includes two subsystems, each adapted for handling a particular signaling protocol, and routes the incoming data received from the processor to the wideband data transmission medium via an appropriate one of the two subsystems.

U.S. Patent Application 20010036176A1 discloses a system that transitions a legacy Public Switched Telephone Network telephony application services model to a data-centric model by exploiting the switching and digital signal processing capacity of a software switch controller and a media gateway defined as core network elements in the voice over packet carrier network.

U.S. Patent Application 20010050918A1 discloses a multi-protocol framing system that is switchably connected to a processor via a packet bus. A wideband data transmission medium is connected to the multi-protocol framing system via a Time Division Multiplexed bus. The multi-protocol framing system includes two subsystems, each adapted for handling a particular signaling protocol, and routes the incoming data received from the processor to the wideband data transmission medium via an appropriate one of the two subsystems.

These systems illustrate various methods of converting signals from a first protocol to a second protocol, but fail to address the network management aspects of interconnecting dissimilar switches. In particular, the call processing that sets up call connections and tears down call connections are not addressed in these references and represents a significant problem in interconnecting dissimilar switching systems.

Solution

The above described problems are solved and a technical advance achieved by the present inter-switch telecommunications system for interconnecting a packet-capable Time Division Multiplexed switch with a non-packet-capable Time Division Multiplexed switch via an Asynchronous Transfer Mode network, collectively termed "inter-switch interconnect system" herein. The inter-switch interconnect system functions to interface a packet switch with a legacy Time Division Multiplexed switch without requiring any changes to the Time Division Multiplexed switch. The inter-switch interconnect system implements a packet-based call connection system that is triggered by the standard CCS7-ISUP signaling protocol, where the packet-capable Time Division Multiplexed switch controls the set-up and tear-down of the packet connections through the Asynchronous Transfer Mode network to the non-packet-capable Time Division Multiplexed switch using the standard CCS7-ISUP signaling protocol for both incoming and outgoing calls. The packet-capable Time Division Multiplexed switch controls call connections both to and from the legacy non-packet-capable Time Division Multiplexed switch.

DETAILED DESCRIPTION OF THE DRAWINGS

Figure 1:
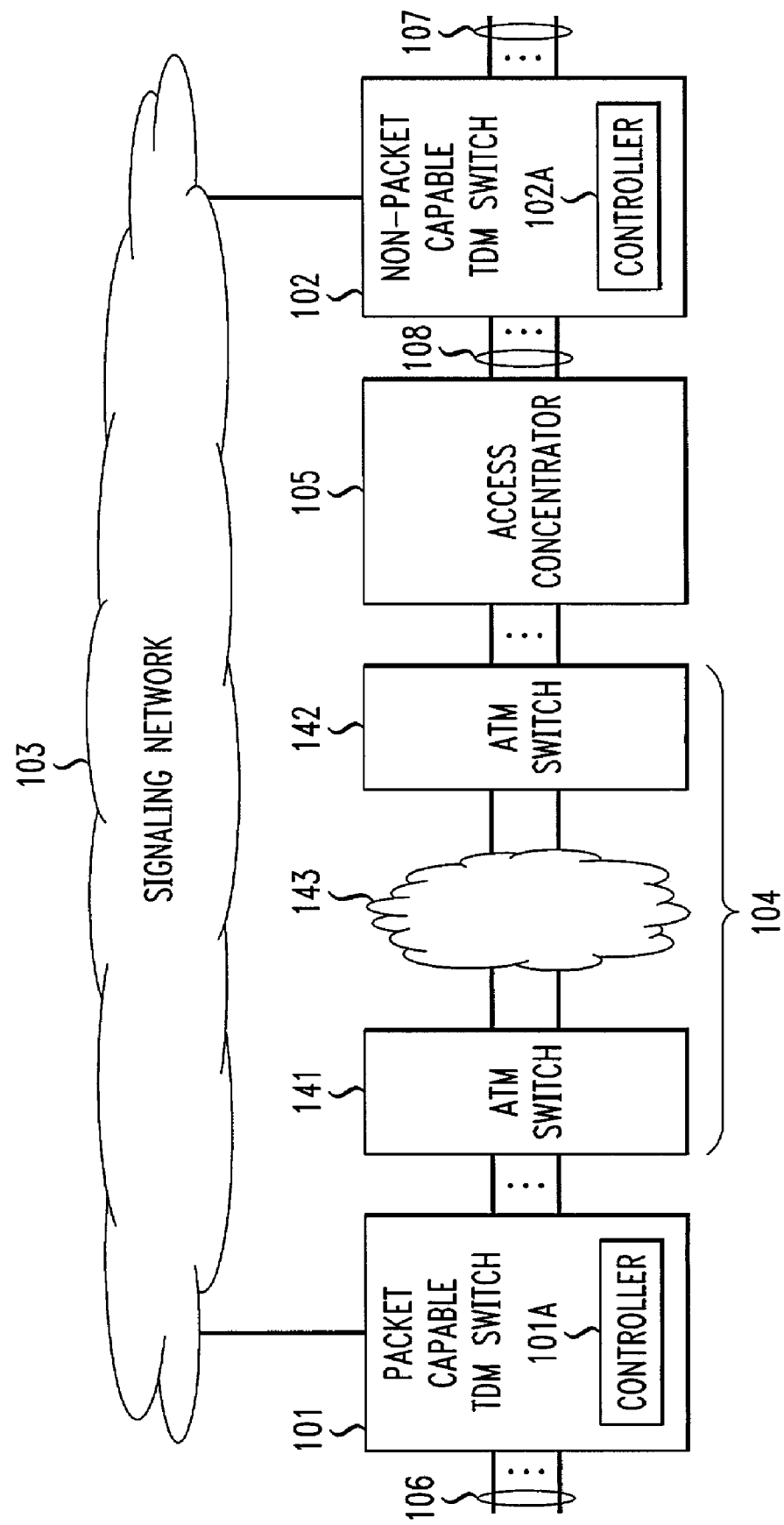
FIG. 1 illustrates in block diagram form the present inter-switch telecommunications system for interconnecting packet-capable Time Division Multiplexed switches with non-packet-capable Time Division Multiplexed switches via an Asynchronous Transfer Mode network.

FIG. 1 illustrates in block diagram form the present inter-switch telecommunications system for interconnecting packet-capable Time Division Multiplexed switches 101 with non-packet-capable Time Division Multiplexed switches 102 via an Asynchronous Transfer Mode network 104. In particular, the packet-capable Time Division Multiplexed switch 101 and the legacy non-packet-capable Time Division Multiplexed switch 102 are incompatible and difficult to interconnect as are the packet switch and the legacy non-packet-capable Time Division Multiplexed switch 102. For example, Time Division Multiplexed switches interface with each other via Time Division Multiplexed circuits and use the industry standard CCS7-ISUP signaling protocol to exchange control signals and coordinate the operation of the Time Division Multiplexed switches. In an analogous manner, the packet switches interface with each other via a packet backbone network and use a collaborative call set-up and completion system that use the industry standard B-ISUP signaling protocol or the industry standard Bearer Independent Call Control (BICC) signaling protocol. However, the packet switches with their BICC call processing are not backward compatible with the existing Time Division Multiplexed switches with their TDM call processing.

In the inter-switch interconnect system illustrated in FIG. 1, a packet-capable Time Division Multiplexed switch 101 is connected to a non-packet-capable Time Division Multiplexed switch 102 via an Asynchronous Transfer Mode network 104. The Asynchronous Transfer Mode network 104 comprises a plurality of Asynchronous Transfer Mode switches 141, 142 that are interconnected via an Asynchronous Transfer Mode backbone 143. An Access Concentrator 105 is used to interface the non-packet-capable Time Division Multiplexed switch 102 with one of the Asynchronous Transfer Mode switches 142. A set of channelized access trunks 108 are used to provide this interconnection and these access trunks can be DS-1 trunks, DS-3 trunks or sets of DS-0 trunks. The access trunks 108 on the non-packet-capable Time Division Multiplexed switch 102 are provisioned in the control space of the packet-capable Time Division Multiplexed switch 101 using unique packet network addresses so that these access trunks have definitive and unique packet network end system addresses. In addition, the actual packet call completion system is controlled by the packet-capable Time Division Multiplexed switch 101 for both incoming and outgoing calls.

The non-packet-capable Time Division Multiplexed switch 102 therefore has a Time Division Multiplexed trunk interface to a packet switched packet backbone network, such that the packet characteristics and packet parameters are totally transparent to the non-packet-capable Time Division Multiplexed switch 102.

Incoming Call Processing

Figure 2:
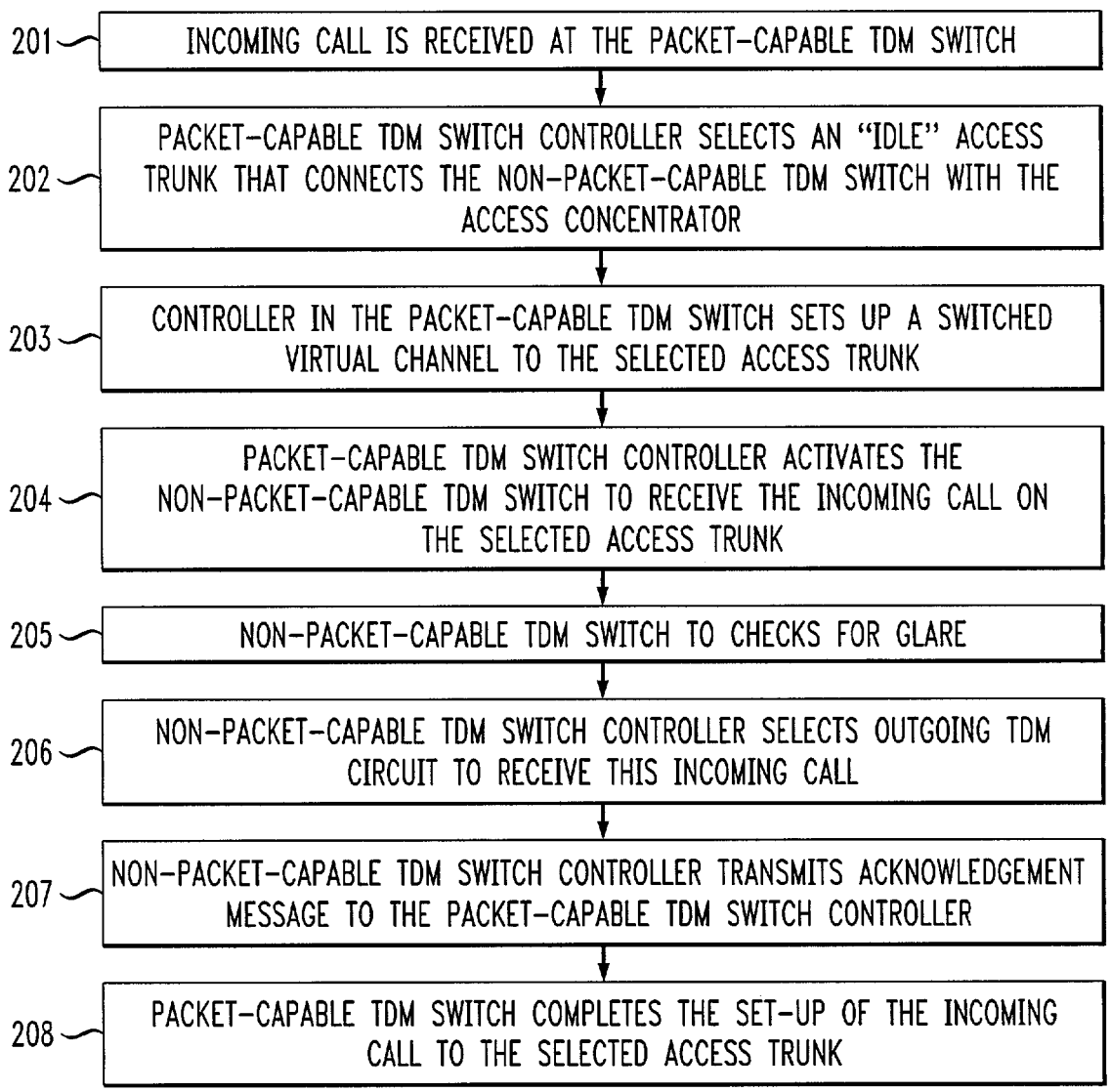
FIG. 2 illustrates in flow diagram form the processing of an incoming call to the non-packet-capable Time Division Multiplexed switch.

FIG. 2 illustrates in flow diagram form the processing of an incoming call to the non-packet-capable Time Division Multiplexed switch 102 from the packet-capable Time Division Multiplexed switch 101 as processed through the Asynchronous Transfer Mode network 104. At step 201, an incoming call is received at the packet-capable Time Division Multiplexed switch 101 via one of the Time Division Multiplexed circuits 106 served by this switch. The destination for this incoming call is one of the outgoing Time Division Multiplexed circuits 107 served by non-packet-capable Time Division Multiplexed switch 102. In order to extend this incoming call to the non-packet-capable Time Division Multiplexed switch 102, the controller 101A in the packet-capable Time Division Multiplexed switch 101 at step 202 selects an "idle" access trunk 108 that interconnects the non-packet-capable Time Division Multiplexed switch 102 with the Access Concentrator 105. The controller 101A in the packet-capable Time Division Multiplexed switch 101 generates commands and control at step 203 to set up a Switched Virtual Circuit (SVC) or select a Permanent Virtual Circuit (PVC) to the selected packet address that corresponds to the selected access trunk 108. This packet address represents a port on the Asynchronous Transfer Mode network 104 that corresponds to the termination of the selected access trunk 108.

The controller 101A in the packet-capable Time Division Multiplexed switch 101 at step 204 signals the controller 102B in the non-packet-capable Time Division Multiplexed switch 102, using the standard Time Division Multiplexed switch signaling protocol, such as CCS7-ISUP, to activate the non-packet-capable Time Division Multiplexed switch 102 to receive the incoming call on the selected access trunk 108. The receipt of this control message, causes the non-packet-capable Time Division Multiplexed switch 102 to check for glare at step 205, that is to ensure that the selected access trunk 108 is available for use and not being selected or in use for another call connection. The controller 102A of the non-packet-capable Time Division Multiplexed switch 102 selects the outgoing Time Division Multiplexed circuit 107 to receive this incoming call at step 206 and completes the standard call set-up between the selected access trunk 108 and the selected outgoing Time Division Multiplexed circuit 107. Once the controller 102A in the non-packet-capable Time Division Multiplexed switch 102 completes the call set-up, it transmits at step 207 an acknowledgement message to the controller 101A in the packet-capable Time Division Multiplexed switch 101 using the standard Time Division Multiplexed switch signaling protocol, such as CCS7-ISUP, to activate the packet-capable Time Division Multiplexed switch 101 to complete the set-up of incoming call to the selected access trunk 108 at step 208.

This completes the call set-up process and the incoming call is extended from the incoming Time Division Multiplexed circuit 106, through the packet-capable Time Division Multiplexed switch 101 to the Asynchronous Transfer Mode network 104. The call is extended from the Asynchronous Transfer Mode switch 141, through the Asynchronous Transfer Mode backbone 143 to the Asynchronous Transfer Mode switch 142, where it is interconnected with the selected access trunk 108 via the Access Concentrator 105. The non-packet-capable Time Division Multiplexed switch 102 further extends this call connection from the selected access trunk 108 to the selected outgoing Time Division Multiplexed circuit 107.

Outgoing Call Processing

Figure 3:
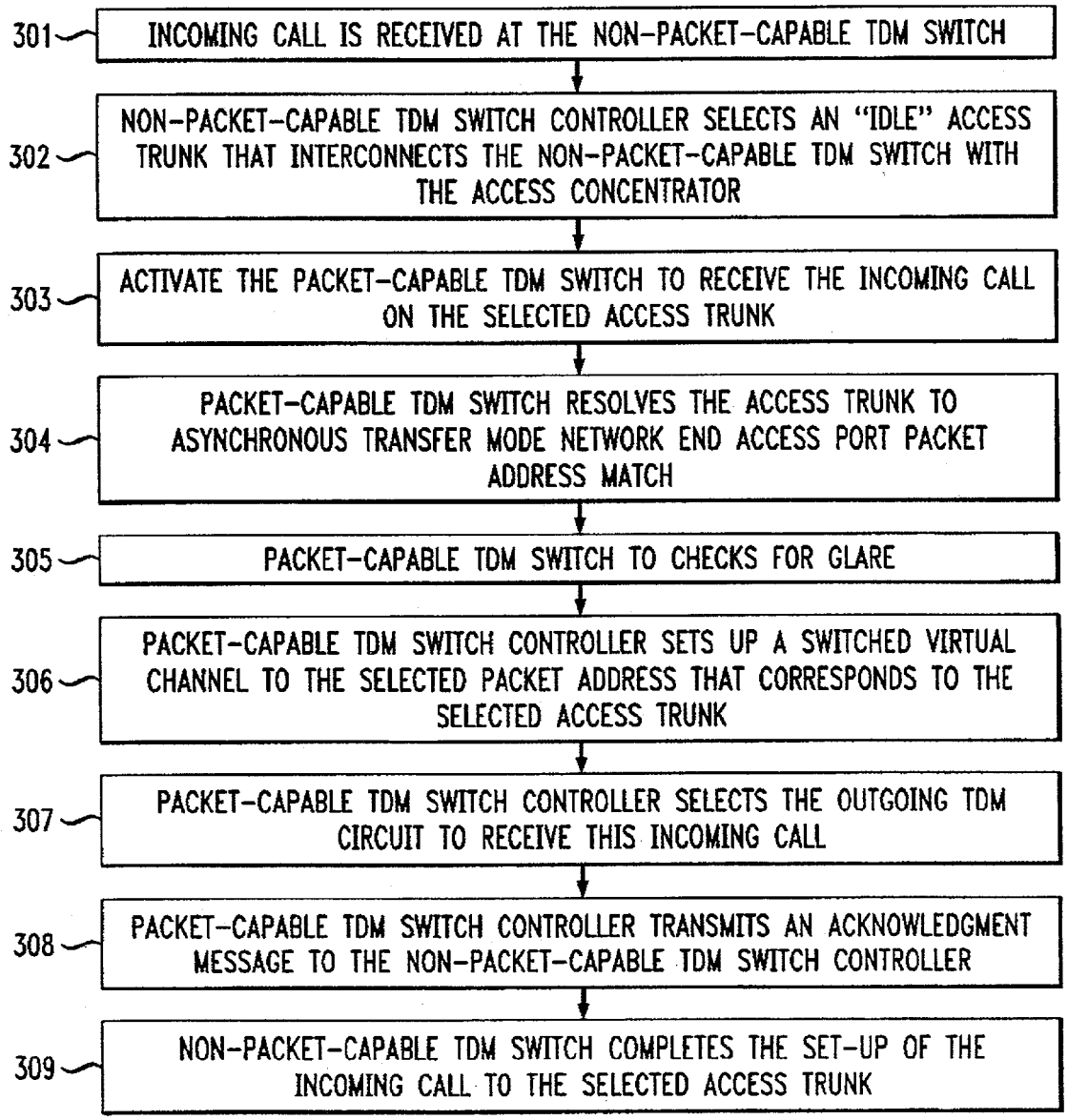
FIG. 3 illustrates in flow diagram form the processing of an outgoing call from the non-packet-capable Time Division Multiplexed switch.

FIG. 3 illustrates in flow diagram form the processing of an outgoing call from the non-packet-capable Time Division Multiplexed switch 102. At step 301, an incoming call is received at the non-packet-capable Time Division Multiplexed switch 102 via one of the Time Division Multiplexed circuits 107 served by this switch. The destination for this incoming call is one of the outgoing Time Division Multiplexed circuits 106 served by packet-capable Time Division Multiplexed switch 101. In order to extend this incoming call to the packet-capable Time Division Multiplexed switch 101, the controller 102A in the non-packet-capable Time Division Multiplexed switch 102 at step 302 selects an "idle" access trunk 108 that interconnects the non-packet-capable Time Division Multiplexed switch 102 with the Access Concentrator 105. The controller 102A in the non-packet-capable Time Division Multiplexed switch 102 at step 303 signals the controller in the packet-capable Time Division Multiplexed switch 101, using the standard Time Division Multiplexed switch signaling protocol, such as CCS7-ISUP, to activate the packet-capable Time Division Multiplexed switch 101 to receive the incoming call on the selected access trunk 108. The receipt of this control message, causes the packet-capable Time Division Multiplexed switch 101 at step 304 to resolve the access trunk to Asynchronous Transfer Mode network end access port packet address match and check for glare at step 305, that is to ensure that the selected access trunk 108 is available for use and not being selected or in use for another call connection. The controller 101A of the packet-capable Time Division Multiplexed switch 101 at step 306 generates commands and control to set up a Switched Virtual Circuit (SVC) or select a Permanent Virtual Circuit (PVC) to the selected packet address that corresponds to the selected access trunk 108. This packet address represents a port on the Asynchronous Transfer Mode network 104 that corresponds to the termination of the selected access trunk 108. The packet-capable Time Division Multiplexed switch 101 at step 307 selects the outgoing Time Division Multiplexed circuit 106 to receive this incoming call and completes the standard call set-up between the Asynchronous Transfer Mode network 104 and the selected outgoing Time Division Multiplexed circuit 106. Once the controller 101A in the packet-capable Time Division Multiplexed switch 101 completes the call set-up, it transmits an acknowledgement message to the controller 102A in the non-packet-capable Time Division Multiplexed switch 102 at step 308 using the standard Time Division Multiplexed switch signaling protocol, such as CCS7-ISUP, to activate the non-packet-capable Time Division Multiplexed switch 102 to complete the set-up of incoming call to the selected access trunk. At step 309, the controller 102A in the non-packet-capable Time Division Multiplexed switch 102 completes the set-up of the incoming call to the selected access trunk.

This completes the call set-up process and the incoming call is extended from the incoming Time Division Multiplexed circuit 107, through the non-packet-capable Time Division Multiplexed switch 102, where it is interconnected with the selected access trunk 108 via the Access Concentrator 105 to the Asynchronous Transfer Mode network 104. The call is extended from the Asynchronous Transfer Mode switch 142, through the Asynchronous Transfer Mode backbone 143 to the Asynchronous Transfer Mode switch 141. The packet-capable Time Division Multiplexed switch 101 further extends this call connection from the selected access trunk 108 to the selected outgoing Time Division Multiplexed circuit 106.

SUMMARY

The inter-switch interconnect system functions to interface a packet switch with a legacy Time Division Multiplexed switch without requiring any changes to the Time Division Multiplexed switch. The inter-switch interconnect system implements a packet-based call connection system that is triggered by the standard CCS7-ISUP signaling protocol, where the packet-capable Time Division Multiplexed switch controls the set-up and tear-down of the packet connections through the Asynchronous Transfer Mode network to the non-packet-capable Time Division Multiplexed switch using the standard CCS7-ISUP signaling protocol for both incoming and outgoing calls.

What is claimed:

1. An inter-switch interconnect system for interconnecting a packet-capable time division multiplex switch with a non-packet-capable time division multiplex switch, comprising:

asynchronous transfer mode network means directly connected to said packet-capable time division multiplex switch for exchanging packets and control signaling therebetween;

access concentrator means connected to said asynchronous transfer mode network means and a plurality of access trunks that are terminated on said non-packet-capable time division multiplex switch for converting between packets of said asynchronous transfer mode network means and time division multiplexed signals of said plurality of access trunks;

signaling network means directly connected to and interconnecting said packet-capable time division multiplex switch and said non-packet-capable time division multiplex switch, absent connection to said asynchronous transfer mode network means, for exchanging control signaling between said packet-capable time division multiplex switch and said non-packet-capable time division multiplex switch; and controller means, operable in said packet-capable time division multiplex switch, comprising:

call setup means for signaling said non-packet-capable time division multiplexed switch via said signaling network means to activate a call connection to said asynchronous transfer mode network means through said access concentrator, asynchronous network control means for communicating directly with said asynchronous transfer mode network means for controlling the set-up and tear-down of packet connections through said asynchronous transfer mode network means to the non-packet-capable time division multiplexed switch through said access concentrator.

2. The inter-switch interconnect system of claim 1 wherein said controller means comprises:

call control means for controlling the set-up and tear-down of packet connections through said asynchronous transfer mode network to said non-packet-capable time division multiplexed switch for both incoming and outgoing calls.

3. The inter-switch interconnect system of claim 1 wherein said controller means comprises:

signal means for directly transmitting and receiving standard CCS7-ISUP signaling protocol messages to and from said non-packet-capable time division multiplexed switch via said signaling network means.

4. The inter-switch interconnect system of claim 1 wherein said controller means comprises:
  address assignment means for provisioning said access trunks using unique packet network addresses on said asynchronous transfer mode network means so said access trunks have definitive and unique packet network end system addresses.

5. The inter-switch interconnect system of claim 1 wherein said controller means comprises:
  access trunk selection means for selecting an idle access trunk that interconnects said non-packet-capable time division multiplexed switch with said access concentrator.

6. The inter-switch interconnect system of claim 5 wherein said controller means further comprises:
  channel selection means for establishing a Switched Virtual Circuit through said asynchronous transfer mode network means to said access concentrator means and said selected access trunk.

7. The inter-switch interconnect system of claim 5 wherein said controller means further comprises:
  channel selection means for selecting a Permanent Virtual Circuit through said asynchronous transfer mode network means to said access concentrator means and said selected access trunk.

8. A method of interconnecting a packet-capable time division multiplex switch with a non-packet-capable time division multiplex switch, comprising:
  directly connecting said packet-capable time division multiplex switch with an asynchronous transfer mode network for exchanging packets and control signaling therebetween;
  converting, in an access converter that is connected to said asynchronous transfer mode network and a plurality of access trunks that are terminated on said non-packet-capable time division multiplex switch, between packets of said asynchronous transfer mode network and time division multiplexed signals of said plurality of access trunks;
  operating a signaling network that is directly connected to said packet-capable time division multiplex switch and said non-packet-capable time division multiplex switch, absent connection to said asynchronous transfer mode network, for exchanging control signaling between said packet-capable time division multiplex switch and said non-packet-capable time division multiplex switch; and
  controlling call connections in said packet-capable time division multiplex switch, comprising:
    signaling said non-packet-capable time division multiplexed switch via said signaling network to activate a call connection to said asynchronous transfer mode network through said access concentrator,
    communicating directly with said asynchronous transfer mode network means for controlling the set-up and tear-down of packet connections through said asynchronous transfer mode network to the non-packet-capable time division multiplexed switch through said access concentrator.

9. The method of interconnecting a packet-capable time division multiplex switch with a non-packet-capable time division multiplex switch through an asynchronous transfer mode network of claim 8 wherein said step of controlling comprises:
  controlling the set-up and tear-down of packet connections through said asynchronous transfer mode network to said non-packet-capable time division multiplexed switch for both incoming and outgoing calls.

10. The method of interconnecting a packet-capable time division multiplex switch with a non-packet-capable time division multiplex switch through an asynchronous transfer mode network of claim 8 wherein said step of controlling comprises:
  directly transmitting and receiving standard CCS7-ISUP signaling protocol messages to and from said non-packet-capable time division multiplexed switch via said signaling network.

11. The method of interconnecting a packet-capable time division multiplex switch with a non-packet-capable time division multiplex switch through an asynchronous transfer mode network of claim 8 wherein said step of controlling comprises:
  provisioning said access trunks using unique packet network addresses on said asynchronous transfer mode network so said access trunks have definitive and unique packet network end system addresses.

12. The method of interconnecting a packet-capable time division multiplex switch with a non-packet-capable time division multiplex switch through an asynchronous transfer mode network of claim 8 wherein said step of controlling comprises:
  selecting an idle access trunk that interconnects said non-packet-capable time division multiplexed switch with said access concentrator.

13. The method of interconnecting a packet-capable time division multiplex switch with a non-packet-capable time division multiplex switch through an asynchronous transfer mode network of claim 12 wherein said step of controlling further comprises:
  establishing a Switched Virtual Circuit through said asynchronous transfer mode network to said access concentrator and said selected access trunk.

14. The method of interconnecting a packet-capable time division multiplex switch with a non-packet-capable time division multiplex switch through an asynchronous transfer mode network of claim 12 wherein said step of controlling further comprises:
  selecting a Permanent Virtual Circuit through said asynchronous transfer mode network to said access concentrator and said selected access trunk.

* * * * *